July 2, 1957  S. A. COLEMAN  2,797,615
COLLAPSIBLE COMBINATION PROJECTOR AND ENLARGER
Filed July 1, 1955  3 Sheets-Sheet 1
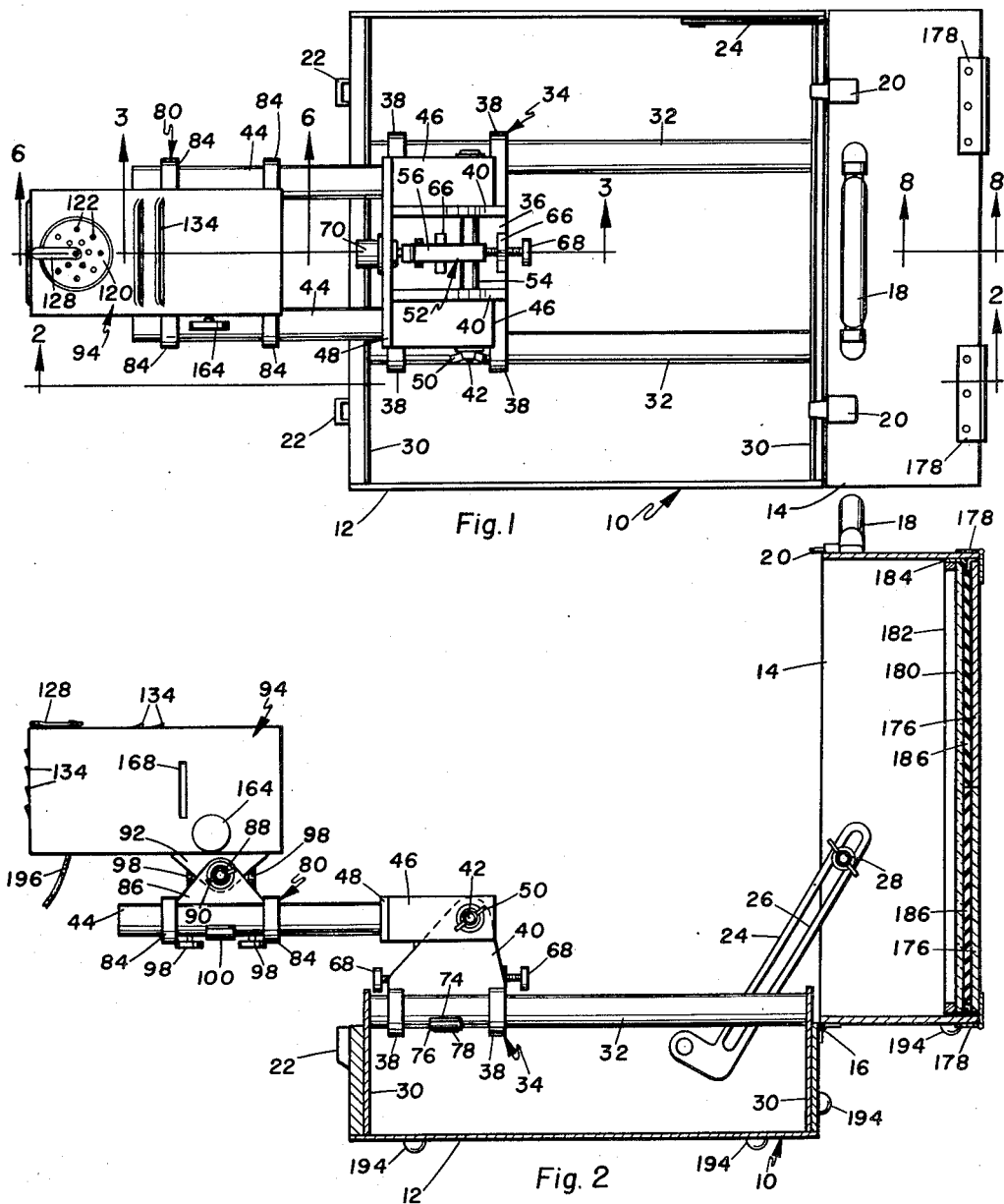
INVENTOR.
SPENCER A. COLEMAN
BY
Knox & Knox INVENTOR.
SPENCER A. COLEMAN
BY
Knox & Knox

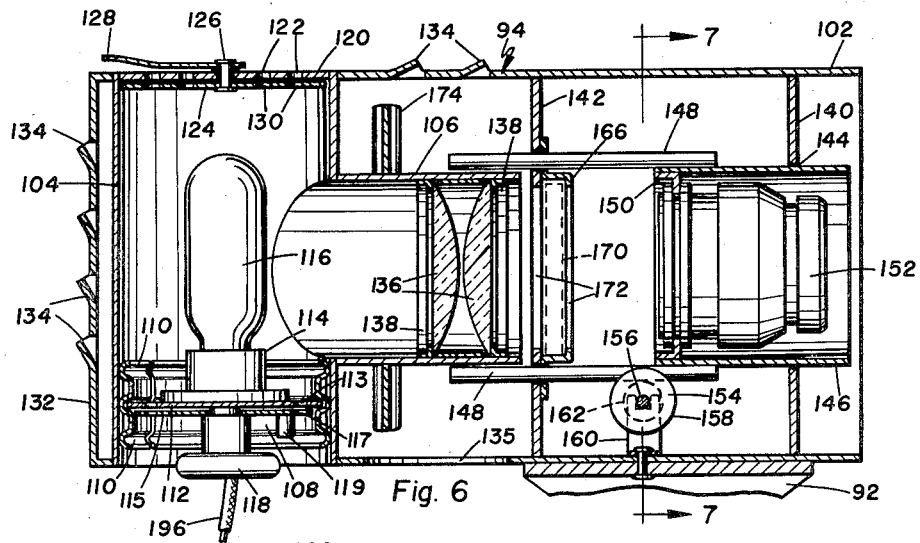

United States Patent Office 2,797,615
Patented July 2, 1957

2,797,615
COLLAPSIBLE COMBINATION PROJECTOR AND ENLARGER

Spencer A. Coleman, San Diego, Calif.

Application July 1, 1955, Serial No. 519,553

6 Claims. (Cl. 88—24)

The present invention relates generally to photographic equipment and more particularly to a collapsible, combination projector and enlarger.

The primary object of this invention is to provide a projector which is foldable into a carrying case, the case serving as a base for the projector when in use and having a self-contained viewing screen in the lid.

Another object of this invention is to provide a projector which is fully adjustable to control picture size and may also be adjusted angularly together with the screen so that the picture is at a comfortable viewing angle.

Another object of this invention is to provide a projector with which the picture may be projected onto any suitable screen to obtain larger images than are possible with the built-in screen.

Another object of this invention is to provide a projector in which the screen may be used as an easel for copying images projected thereon.

Another object of this invention is to provide a projector in which the screen is adapted to hold photosensitive paper for making photographic enlargements.

Another object of this invention is to provide a projector which is practicable and inexpensive to manufacture.

Another object of this invention is to provide a projector which is adapted for fabrication from many different materials, so that the choice of material can be according to the dictates of availability and price considerations, the exact sizes and proportions being matters easily determined to suit particular conditions and needs.

Finally, it is an object to provide a combination projector and enlarger of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 1 is a top plan view of the device in opened position for use as a projector.

Fig. 2 is a sectional view taken on the line 2—2 of Fig. 1.

Fig. 6 is an enlarged sectional view taken on the line 6—6 of Fig. 1.

Fig. 7 is a sectional view taken on the line 7—7 of Fig. 6.

Fig. 8 is an enlarged fragmentary sectional view taken on the line 8—8 of Fig. 1.

Fig. 9 is a sectional view similar to Fig. 2, but showing the device folded and the case closed.

Figure 3:
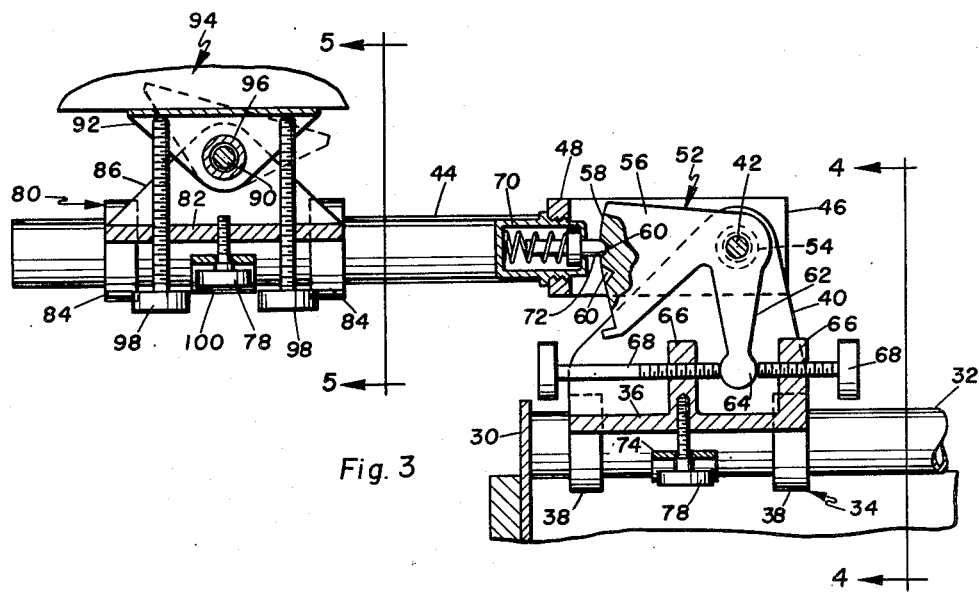
Fig. 3 is an enlarged fragmentary sectional view taken on the line 3—3 of Fig. 1.

Referring now to the drawings in detail, the device includes a case 10 having a base portion 12 and a lid 14 pivotally attached thereto at one end by a hinge 16. The case 10 may be constructed to resemble a piece of luggage and is fitted with a suitable handle 18 and fasteners or catches 20 and 22. The lid 14 is held open by a stay bar 24 pivotally attached at one end to the base 12, said stay bar having a longitudinal slot 26 which fits over a lock screw 28 in said lid, so that the lid can be locked in any desired angular position.

The base 12 has a pair of fixed end plates 30 between which are secured two spaced parallel guide tubes or ways 32. Slidably mounted on the ways 32 is a carriage 34 comprising a bed plate 36 having lugs 38 extending from each end, said lugs being bored for a close sliding fit on said ways. Integral with the bed plate 36 and extending upwardly therefrom are two parallel bracket plates 40 through which extends a transverse bolt 42. Pivotally mounted on the bolt 42 outboard of the bracket plates 40 are a pair of swinging ways 44, their pivoted ends being reinforced by external sleeves 46 which are preferably square in cross section for rigidity of the assembly. The ways 44 are held in parallel relation by a cross bar 48 fixed therebetween adjacent the sleeves 46, the bolt 42 being fitted with a wing nut 50 so that the ways 44 can be locked in any angular position.

Figure 4:
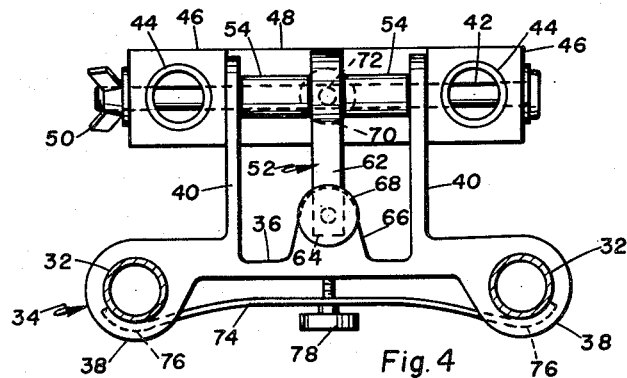
Fig. 4 is a sectional view taken on the line 4—4 of Fig. 3.
Figure 5:
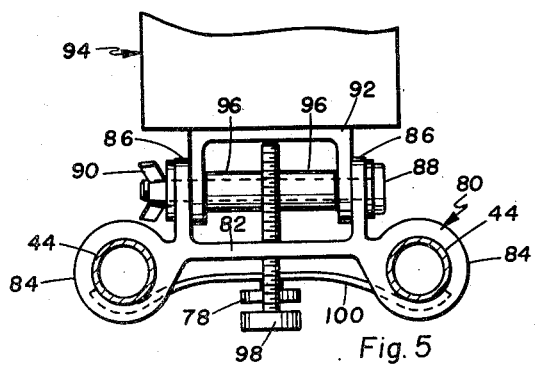
Fig. 5 is a sectional view taken on the line 5—5 of Fig. 3.

Pivotally mounted on the bolt 42 is a locking member 52 which is centered between the bracket plates 40 by tubular spacers 54. The locking member 52 has an extended lobe 56 with a generally arcuate end 58 in which are shallow detent sockets 60. The locking member 52 also has an arm 62 extending substantially normal to the lobe 56 and having a rounded boss 64 at its extremity. Extending upwardly from the bed plate 36 are two spaced ears 66 through which are threaded micrometer adjustment screws 68. The boss 64 is held between the screws 68 and can thus be adjusted and locked at various angular positions through a limited range. Fixed in the cross bar 48 is a spring detent 70 of any suitable type having a protruding detent pin 72 which engages in the sockets 60. Thus the ways 44 can be locked at preset angular positions by means of the locking member 52. The carriage 34 is held in place at any position along the ways 32 by means of a clamp bar 74 which has arcuate ends 76 shaped to engage the ways, as shown in Fig. 4, said clamp bar being tightened by a central lock screw 78 threaded into the bed plate 36.

Slidably mounted on the ways 44 is a second carriage 80 comprising a bed plate 82 having extended lugs 84 bored to fit said ways. Projecting upwardly from the bed plate 82 are two bracket plates 86 through which is fitted a bolt 88 having a wing nut 90 thereon. Pivotally mounted on the bolt 88 between the bracket plates 86 is an inverted U-shaped bracket 92 on which is secured a lamp head assembly 94, said bolt being fitted with a spacer sleeve 96 to prevent distortion of said bracket plates when the wing nut is tightened. The angle of the lamp head 94 is adjusted by means of a pair of alignment screws 98 extending upwardly through the bed plate 82 and engaging the bracket 92 on opposite sides of the bolt 88. The carriage 80 is held in place on the ways 44 by a clamp bar 100, similar to but slightly shorter than the clamp bar 74, and secured by a further lock screw 78 threaded into the bed plate 82.

The lamp head 94 comprises an elongated casing 102 which is shown generally rectangular in cross section for simplicity. At the rear end of the casing 102 is a cylindrical lamp house 104 having a tubular housing 106 extending therefrom at right angles toward the forward end of the casing. Slidably mounted in the lamp house 102 is a resilient split sleeve 108 having a plurality of annular ribs 110 in frictional contact with the lamp house, as in Fig. 6. Secured in one of the ribs 110 is a plate 112 on which is a lamp holder 114 and a projection lamp 116, while extending from the other side of the plate is a knob 118 to facilitate manual adjustment of the sleeve 108 for centering the lamp. The plate 112 has a plurality of vents 113 therein and immediately below said plate is a ring plate 115 mounted for rotation about the axis of the knob 118. The ring plate 115 also has a plurality of vents 117 positioned to align with the vents 113, and said ring plate is fitted with a small knob 119 for manual rotation thereof to open or close the vents. The upper end of the lamp house 102 is closed by a fixed disc 120 having a plurality of vents 122 therein. Inside the fixed disc 120 is a movable disc 124 pivotally mounted on a pin 126 and having an external handle 128 connected thereto. The disc 124 also has a plurality of vents 130 positioned to align with the vents 122. Thus by turning the handle 128 the vents to the lamp house 102 can be opened and closed. The rear end 132 and top of the casing 102 having a plurality of louvers 134 for further ventilation and the bottom of the casing forward of the lamp house 102 is open as at 135. Mounted in the housing 106 are conventional condenser lenses 136 held in place by suitable retaining rings 138.

Adjacent the forward end of the casing 102 is a transverse front bulkhead 140 and spaced longitudinally therefrom is a rear bulkhead 142. The front bulkhead 140 has a circular opening 144 in which is slidably mounted a cylindrical lens barrel 146, having a pair of longitudinally extending guide rods 148 fixed thereto in diametrically spaced relation. The guide rods 148 extend slidably through the rear bulkhead 142 so that the lens barrel 146 is held accurately in alignment during axial adjustment. The lens barrel 146 and the housing 106 are, of course in axial alignment. At the rear end of the lens barrel 146 is a mounting ring 150 in which is mounted a conventional lens assembly 152. This lens assembly 152 is preferably one having an adjustable aperture, such as that used in an enlarger, so that the device may be used as a projector or an enlarger without changing the lens. Adjustment of the lens barrel 146 is accomplished by means of a grooved wheel 154 mounted on a shaft 156 extending transversely across the casing 102, said wheel engaging one of the guide rods 148, as shown in Figs. 6 and 7. If desired, the wheel 154 may be made from resilient material such as plastic so that the flanges 158 grip the guide rod 148 firmly. To ensure positive grip, the shaft 156 is biased by an arcuate leaf spring 160 suitably secured to the casing 102, said spring having slotted ends 162 which straddle said shaft on either side of the wheel 154. The shaft 156 is fitted with an external focusing knob 164 for manual adjustment.

Fixed to the rear bulkhead 142 is a slide receiver 166 comprising a generally rectangular channel, of sheet metal or the like, extending transversely across the casing 102, said casing having a slot 168 at each end of said receiver for insertion of a slide holder 170, indicated in dash line in Fig. 6. The slide receiver 166 and the rear bulkhead 142 both have apertures 172 in alignment with the lens barrel 146. Fixed on the housing 106 adjacent the lamp house 104 is a corrugated shield disc 174 to protect the slide receiver 166 from excess heat.

The lid 14 has a top panel comprising a pair of doors 176 pivotally attached to the lid at their outer edges by hinges 178, each door enclosing substantially half the area of the lid. Mounted in the lid 14 inwardly of the doors 176 is a transparent panel 180, of plastic or glass, held in place by a suitable frame 182 and retaining flange 184, as in Fig. 8. The doors 176 each have a resilient pad 186 secured to the inner face thereof to bear against the transparent panel 180, said doors being held in closed position by a magnetic catch 188 in the lid 14 and suitable magnetic elements 190 in each door. Other types of catches or fasteners may be used if desired. For projection purposes a screen panel 192 of suitable material is placed against the transparent panel 180 and held by the closed doors 176.

For use as a projector, the device is opened as shown in Fig. 1 and a slide holder 170 carrying the slide to be viewed is placed in the receiver 166. It should be noted that in this position the device is well balanced, the lid 14 effectively counterbalancing the lamp head 94 sufficiently to prevent instability. The carriages 34 and 80 are adjusted to obtain an image of the required size and the lens barrel 146 is adjusted to focus the image sharply on the screen panel 192. With this arrangement the image is viewed from behind the lamp head 94. The image may be viewed from the other side of the lid 14 by the back projection method by opening the doors 176 completely and using ground glass or other translucent material as the screen panel 192. This arrangement is more suitable for group viewing and the lid 14, together with the lamp head 94 may be adjusted to place the screen panel 192 at a comfortable viewing angle.

As a further alternative, the screen panel 192 may be replaced by a sheet of paper or the like and the image traced or copied directly thereon, thus enabling the user to draw accurate reproductions of the slide, even in color. The angular adjustment of the lid 14 is advantageous in this respect since the screen can be set at a convenient drawing angle and used as an easel.

To project larger images the screen panel 192 may be removed completely so that, with the doors 176 open, the image can be projected through the transparent panel 180 to a suitable screen. Thus the device may be used with conventional projection screens without the need for reversing or otherwise moving the lamp head 94. The lamp head 94 may be adapted for use with a conventional slide carrier or an automatic slide changer if desired, such devices being well known in the art.

When the device is used as an enlarger, the lamp 116 may be replaced by one of lower power and the handle 128 turned to close the vents 122 and prevent light leakage. The slide holder 170 is used to hold the negative to be enlarged and the image is focused in the normal manner. The receiver 166 may, of course, be adapted to fit a conventional negative holder as used in enlargers. The photosensitive print paper is placed with its emulsion side against the transparent panel 180 and is held flat by closing the doors 176. The lid 14 may be square in shape if desired so that pictures of both horizontal and vertical format may be composed.

The device may also be used as an enlarger in an upright position with the lid 14 serving as a base. In this position, a conventional enlarging or printing easel may be placed in the lid to hold the photosensitive paper.

When not in use the device can be folded completely into the case 10, as shown in Fig. 9, without dismantling any of the parts. The electrical power cord 196 for the lamp 116 may be coiled in the ample storage space provided in the case 10. The space may also be used to hold slide files or negatives. The case 10 itself is compact and conveniently shaped for storage in a minimum of space. If desired, the case may be fitted with suitable resilient feet 194 to prevent damage to surfaces on which the device is used.

It is understood that minor variation from the form of the invention disclosed herein may be made without departure from the spirit and scope of the invention, and that the specification and drawing are to be considered as merely illustrative rather than limiting.

I claim:

1. A collapsible combination projector and enlarger, comprising: a casing having a base portion and a lid pivotally attached to one end of said base portion; said lid having a screen element therein; fixed longitudinal guide ways in said base portion; a carriage slidably mounted on said ways; an element mounted on said carriage for pivotal adjustment through approximately a straight angle about a horizontal axis; a lamp head mounted on said element; said lamp head being inverted when moved from collapsed position within the casing to an operative position.

2. A combination projector and enlarger according to claim 1, wherein said lamp head includes a lens assembly, a generally cylindrical lens barrel having a lens operatively mounted therein; fixed guide rods extending longitudinally from said lens barrel and being mounted in said lamp head for axial sliding movement; and a manually operable focusing wheel frictionally engaging one of said guide rods; whereby said lens assembly is made fully retractable into said lamp head to facilitate collapse thereof into said casing.

3. A collapsible combination projector and enlarger, comprising: a casing having a base portion and a lid pivotally attached to one end of said base portion; said lid having a screen element therein; fixed longitudinal guide ways in said base portion; a carriage slidably mounted on said fixed ways; hinged ways pivotally attached to said carriage for pivotal adjustment through approximately a straight angle about a horizontal axis; a lamp head mounted on said hinged ways; said lamp head and hinged ways being inverted when moved from collapsed position within the casing to an operative position.

4. A collapsible combination projector and enlarger, comprising: a casing having a base portion and a lid pivotally attached to one end of said base portion; said lid having a screen element therein; fixed longitudinal guide ways in said base portion; a carriage slidably mounted on said fixed ways; hinged ways pivotally attached to said carriage; means for locking said hinged ways in several angular positions relative to said fixed ways; a further carriage slidably mounted on said hinged ways; a lamp head angularly adjustably mounted on said last mentioned carriage; said lamp head and hinged ways being inverted when moved from a collapsed position within said casing to an operative position.

5. A collapsible combination projector and enlarger, comprising: a casing having a base portion and a lid pivotally attached to one end of said base portion; said lid having a screen element therein; a pair of spaced, parallel guide ways fixed longitudinally in said base portion; a carriage slidably mounted on said ways, and means to lock said carriage on the ways; a pair of spaced, parallel hinged ways pivotally attached at one end to said carriage; a locking member pivotally mounted on said carriage between said hinged ways and having a plurality of spaced sockets therein; a detent element mounted in fixed relation to said hinged ways and selectively engageable in said sockets; said locking member being angularly adjustable; a further carriage slidably mounted on said hinged ways; a lamp head angularly adjustably mounted on said last mentioned carriage; said lamp head being adjustable so that the axis thereof is shiftable in a vertical plane; and means for locking said lid in various angular positions with the transverse axis thereof shiftable in said plane.

6. A collapsible combination projector and enlarger, comprising: a casing having a base portion and a lid pivotally attached to one end of said base portion; a pair of spaced, parallel guide ways fixed longitudinally in said base portion; a carriage slidably mounted on said ways; and means to lock said carriage on the ways; a pair of spaced, parallel hinged ways pivotally attached at one end to said carriage; a locking member angularly adjustably mounted in said carriage; said hinged ways having detent means engageable with said locking member as well as means for micrometer adjustment of the hinged ways relative to said locking member; a further carriage slidably mounted on said hinged ways; a lamp head angularly adjustably mounted on said last mentioned carriage; said lamp head being adjustable so that the axis thereof is shiftable in a vertical plane; said lid having a transparent panel fixed therein; a pair of doors pivotally attached to opposite sides of said lid and covering said panel in closed position; said doors having resilient pads on the inner faces thereof for contact with said panel; and means for locking said lid in various angular positions.

References Cited in the file of this patent

UNITED STATES PATENTS

| | | |
|---|---|---|
| 2,133,581 | Simmon | Oct. 18, 1938 |
| 2,484,448 | Cook | Oct. 11, 1949 |
| 2,506,168 | Perrillo | May 2, 1950 |
| 2,599,269 | Markle | June 3, 1952 |

FOREIGN PATENTS

| | | |
|---|---|---|
| 719,438 | France | Nov. 14, 1931 |